(12) United States Patent
Isom

(10) Patent No.: US 10,718,364 B2
(45) Date of Patent: Jul. 21, 2020

(54) ACCESSORY CLAMP FOR ELONGATED STRUCTURAL MEMBERS

(71) Applicant: Geromie Joel Isom, Oro Valley, AZ (US)

(72) Inventor: Geromie Joel Isom, Oro Valley, AZ (US)

(*) Notice: Subject to any disclaimer, the term of this patent is extended or adjusted under 35 U.S.C. 154(b) by 0 days.

(21) Appl. No.: 16/158,303

(22) Filed: Oct. 12, 2018

(65) Prior Publication Data

US 2020/0116173 A1  Apr. 16, 2020

(51) Int. Cl.
F16B 2/10 (2006.01)
F16B 2/08 (2006.01)
B63H 20/06 (2006.01)

(52) U.S. Cl.
CPC .................. F16B 2/10 (2013.01); F16B 2/08 (2013.01); B63H 20/06 (2013.01)

(58) Field of Classification Search
CPC ............... F16B 2/10; F16B 2/08; B63H 20/06
See application file for complete search history.

(56) References Cited

U.S. PATENT DOCUMENTS

| | | | | | |
|---|---|---|---|---|---|
| 1,690,435 A | * | 11/1928 | Savage | .................. | B63H 20/06 248/641 |
| 2,412,825 A | * | 12/1946 | McCollum | ............. | B63H 11/02 60/221 |
| 3,245,640 A | * | 4/1966 | Ibbs | ..................... | B63H 20/007 248/642 |
| 3,316,873 A | * | 5/1967 | Dismukes | ............... | B63B 1/125 114/39.24 |
| 4,624,206 A | * | 11/1986 | Frye | ..................... | B63H 20/007 114/146 |
| 4,953,819 A | * | 9/1990 | Davis | .................. | A61M 5/1415 211/107 |
| 5,485,981 A | * | 1/1996 | Lindahl | .................... | B63B 7/087 114/345 |
| 5,601,463 A | * | 2/1997 | Kobelt | ................. | B63H 21/265 114/150 |
| 5,752,733 A | * | 5/1998 | Marshall | ................... | A45F 3/14 294/154 |
| 7,828,614 B2 | * | 11/2010 | Cribbs | ................... | B63H 20/06 248/640 |
| 9,073,495 B2 | * | 7/2015 | Toutant | .................... | B60R 13/01 |
| 9,445,584 B2 | * | 9/2016 | Smith | ..................... | A01K 97/08 |
| 9,482,368 B1 | * | 11/2016 | Hung | ..................... | B25B 5/147 |
| 9,713,759 B2 | * | 7/2017 | Liebner | ................... | A63C 11/24 |
| 2003/0230326 A1 | * | 12/2003 | Lin | ........................ | A45B 11/00 135/20.1 |

(Continued)

*Primary Examiner* — Victor D Batson
*Assistant Examiner* — Matthew J Sullivan
(74) *Attorney, Agent, or Firm* — Mark V. Loen

(57) ABSTRACT

A clamping system which holds fast to a rigid elongated structure that is tubular in nature, but not circular in circumference. The clamping system achieves stability by compressive forces generally in a constrictive fashion. However, the clamp does not completely encircle the rigid elongated structure. Further, this clamping system utilizes the striations and/or noncircular nature of the elongated structure to hold fast. The clamping system is temporary and requires no modification to original hardware. The clamping system provides at least one mounting point for accessories. This clamp is installed and removed by hand or with common hand tools, depending on the style of clamp.

6 Claims, 10 Drawing Sheets

(56) References Cited

U.S. PATENT DOCUMENTS

| | | | |
|---|---|---|---|
| 2016/0333908 A1* | 11/2016 | Burnett | F16B 2/185 |
| 2017/0197554 A1* | 7/2017 | Rouleau | B60P 3/00 |
| 2018/0066684 A1* | 3/2018 | Burnett | B25B 5/04 |
| 2019/0120407 A1* | 4/2019 | Huovila | B62J 11/00 |
| 2019/0193249 A1* | 6/2019 | Burnett | B25B 5/12 |

* cited by examiner

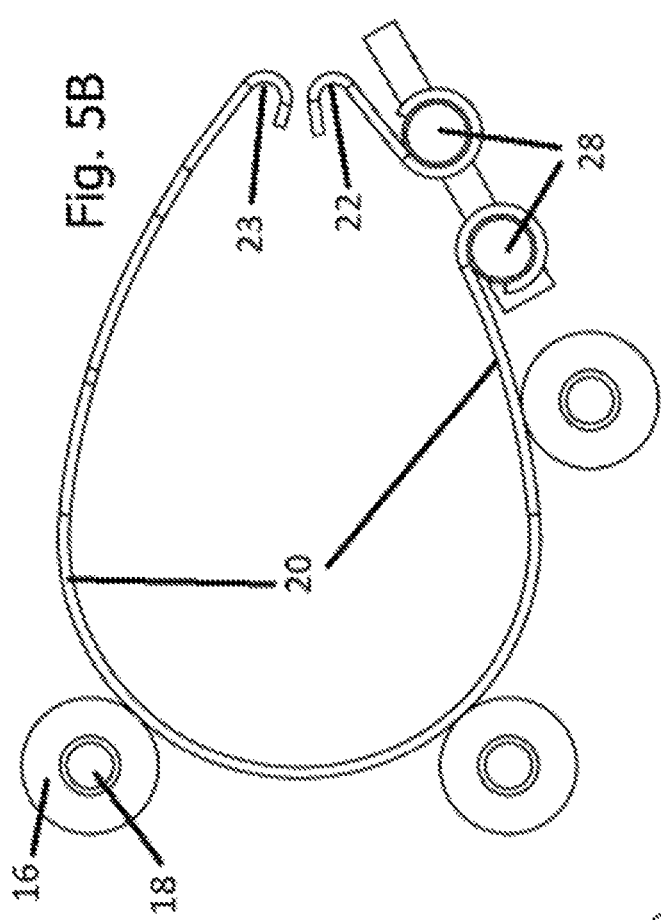
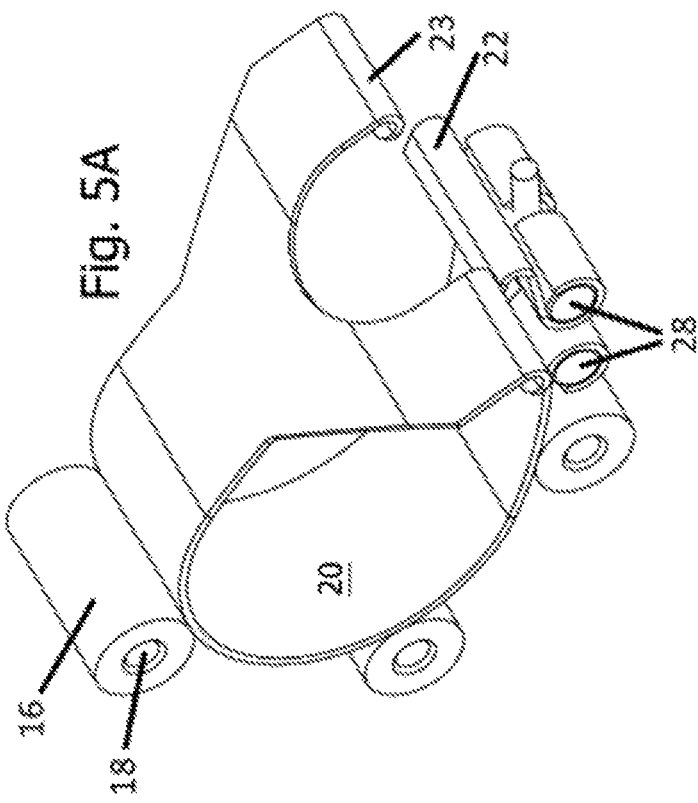

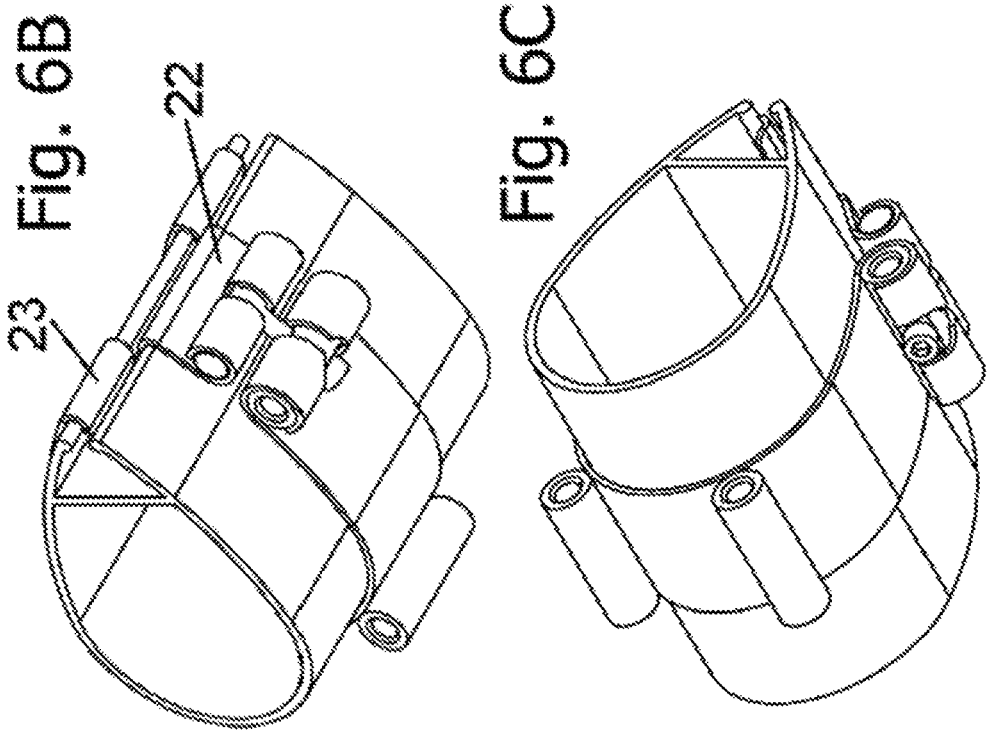
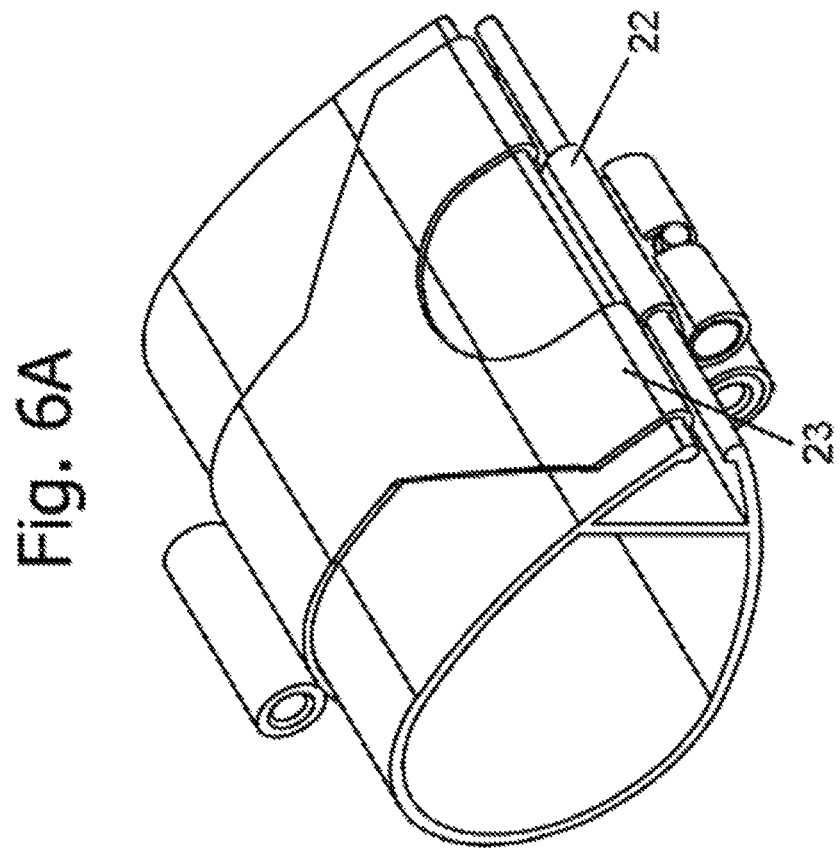

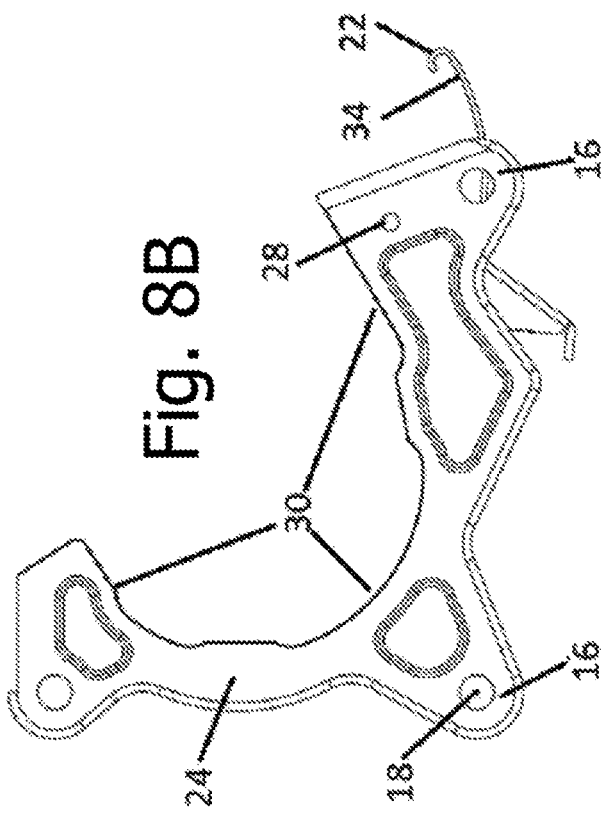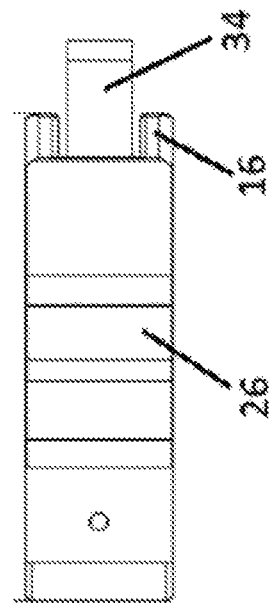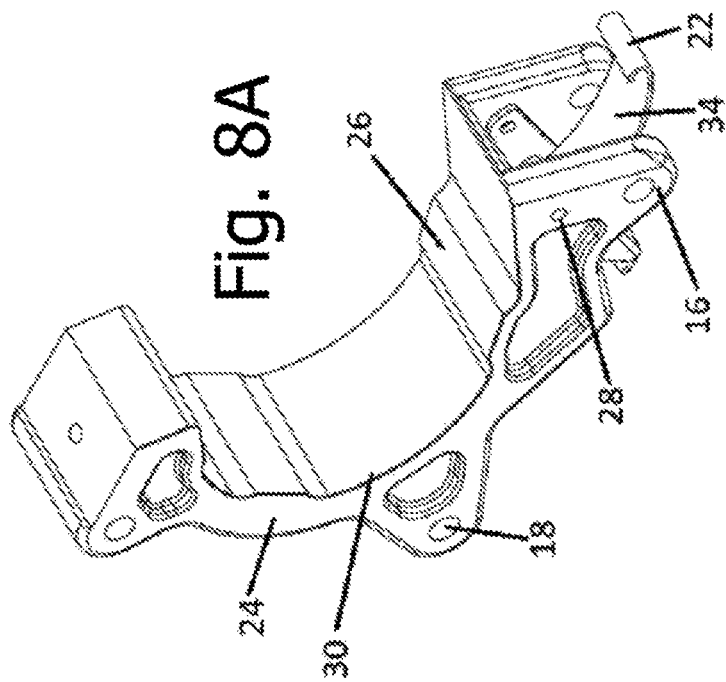

ACCESSORY CLAMP FOR ELONGATED STRUCTURAL MEMBERS

CROSS REFERENCE TO RELATED APPLICATIONS

Not Applicable

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed toward improvements in elongated structural member attachments by providing a removable clamp for connecting accessory items without damage to a boat.

(2) Description of Related Art

U.S. Pat. No. 3,092,378 by Aulner discloses a vise grip C clamp combination, scissor/pliers type compression adjusted by a screw. The vise grips are pliers that utilize linear compression on the object to be held. In contrast, the present invention uses constrictive force and is designed for accessories to be attached.

U.S. Pat. No. 5,630,576 by Williams discloses a saddle clamp work piece apparatus which holds a cylinder to a bench. In contrast, the present invention is designed to hold an object by use of radial set screws and does not utilize a groove or striation in anyway.

U.S. Pat. No. 6,098,973 by Khachatoorian discloses a C clamp utilizing simple linear screw compression. This device uses a linear squeezing force with no intent of attaching accessories to the clamp.

U.S. Pat. No. 5,222,420 by Sorensen discloses a quick action bar clamp, which uses a quick linear adjustment then compresses with an offset cam. This invention utilizes a linear compressive force and has no means of attaching any other object to it.

U.S. Pat. No. 4,637,332 by Glime discloses a pivotal motor mount that is fully wrapped round member sideways rotating mount. This invention does include compressive forces on multiple points. However, it is designed solely for a motor-mount and wraps completely around, leaving no place for the trampoline, travelers, sails or any other similar original equipment.

U.S. Pat. No. 4,371,144 by Godlewski discloses a motor securing device for watercraft. This device is for an inflatable craft and does not clamp at all. It does form around original equipment and holds a battery for counter-weight against the force of the motor. It does not provide any compressive forces and if the craft were to be jostled abruptly, the battery and the entire embodiment may come off and be lost.

U.S. Pat. No. 5,564,955 by Ingraham discloses a bracket for supporting an electric powered outboard motor and an electric battery relative to a marine vessel This device is clamped to the crossmember but fully utilizes the dolphin striker and the lower original structural member. This invention discloses an attachment system that is specific to a battery and motor. It must be utilized in an exact position and extensively utilizes the dolphin striker. In contrast, the present invention can be placed in multiple points of a beach catamaran and is not specifically designed for any one accessory.

U.S. Pat. No. 4,227,480 by Carras discloses a motor mount bracket for twin-hull sail boats This invention is advertised and known as the Cheetah. It bolts to the aft crossmember for one particular accessory, a motor. This invention requires drilling into the owner's boat and permanently mounting this fixture to the craft.

In contrast, the present invention is far superior in that no permanent modifications are needed to the craft. Further, the accessory clamp can be used for multiple accessories and can be mounted in multiple places. The embodied invention is small and inconspicuous, whereas the Cheetah is rather large and extends out dangerously far aft in order for the motor to clear all original steering equipment.

Prior forms of fastening accessories to a watercraft included piercing the structure and using screws, rivets or other common fasteners.

Other prior art methods would be to just tie something like a ladder, anchor rope or other rope to the sailboat in only a few places where this is possible. Beach Catamaran sailboats have the seating area (trampoline) that is pulled out to most areas of the structural spars. With the trampoline in the way, users cannot tie on to most areas, only at the corners or where lacing may allow. In contrast, the present invention allows a much more versatile arrangement of attachment places.

Currently if a user wanted a dry-box or a place to put their gear, there are pouches on the market that one could fasten to the lacing of the trampoline for catamarans under 17 feet. Newer larger beach catamarans are coming with stowage places in the hulls. Tied on pouches work for a few small objects but not for anything larger, like an anchor, jacket, radio etc.

BRIEF SUMMARY OF THE INVENTION

In summary, the embodied invention comprises multiple clamps that utilize the grooves in an otherwise smooth cylindrical or nearly cylindrical surface. The purpose of these clamps is to affix other items quickly, easily, securely and temporarily to any craft or larger item, but specifically beach catamarans. These clamps cause little or no damage to the original equipment.

Each embodiment contains three basic elements. Each one utilizes a mechanical constriction or tightening device that throughout the clamp pressure is applied transversely, tangentially onto the craft's elongated rigid member gripping in more than two places. Each embodiment shall include at least one place to attach an accessory of the users choosing. Each embodiment shall also have a component wrapping around the original elongated structure at least halfway but not all the way.

BRIEF DESCRIPTION OF THE SEVERAL VIEWS OF THE DRAWING(S)

FIGS. 5A-5B show a full wrap semi-flexible clamp.

FIGS. 6A-6C shows a full-wrap semi-flexible clamp.

FIGS. 8A-8C show a ¾ wrap Clamp.

DETAILED DESCRIPTION OF THE INVENTION

Figure 1:
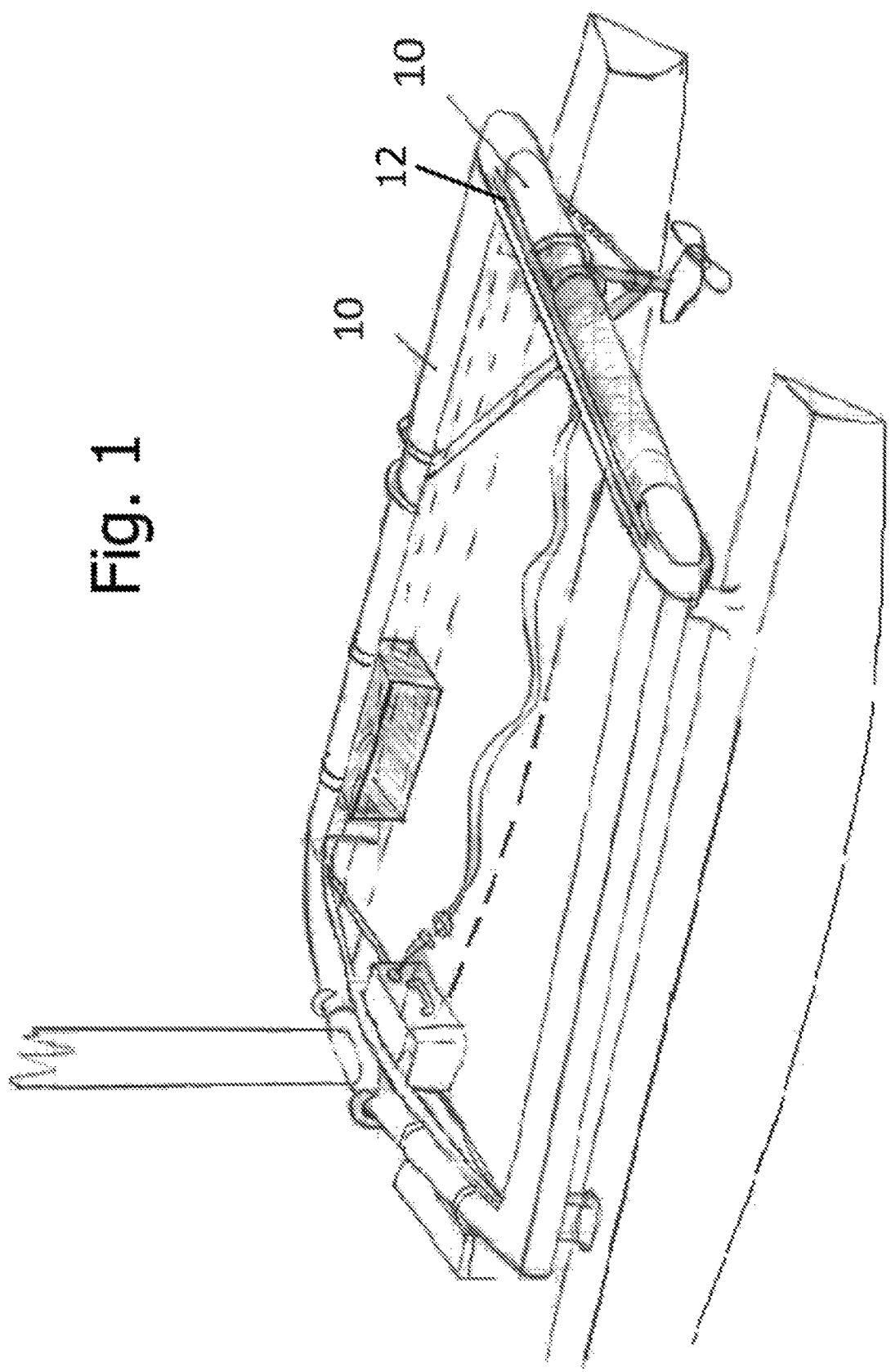
FIG. 1 shows possible positions of the invention on a multi-hull sailboat.
Figure 3:
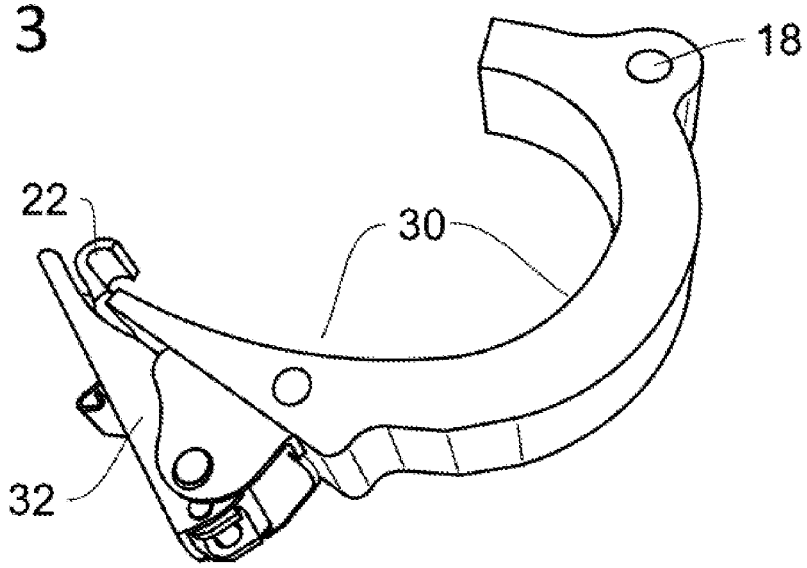
FIG. 3 shows an isometric view of a ¾ wrap clamp.
Figure 4:
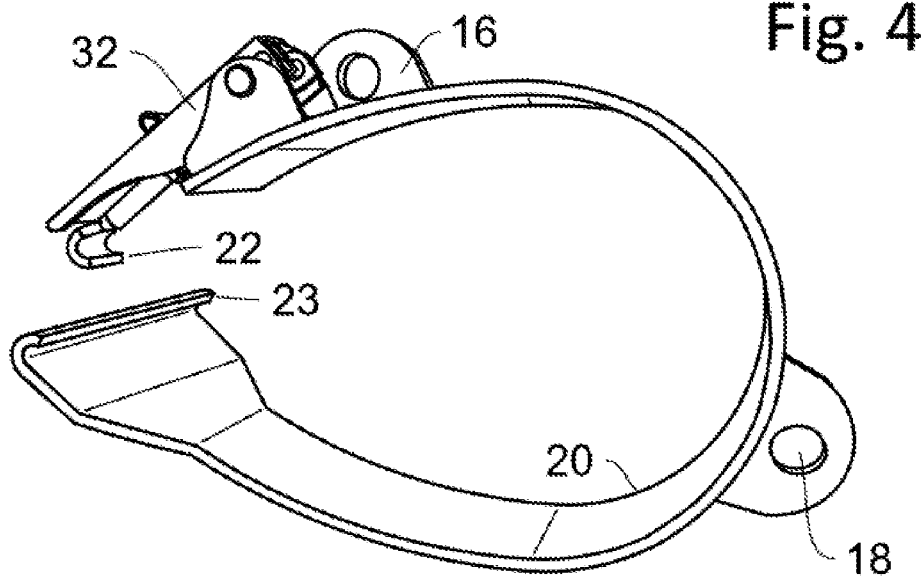
FIG. 4 shows a full-wrap bent, tabbed clamp.
Figure 7B:
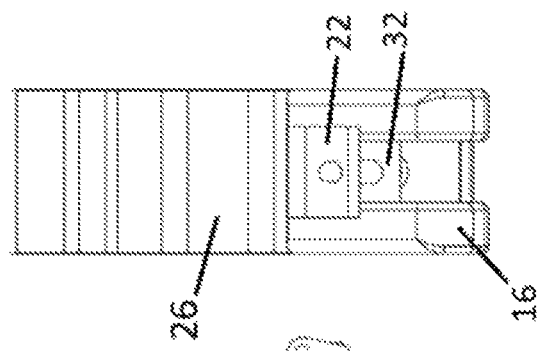
FIGS. 7A-7D show a ¾ wrap clamp in isometric, right, front, and top views respectively.
Figure 7D:
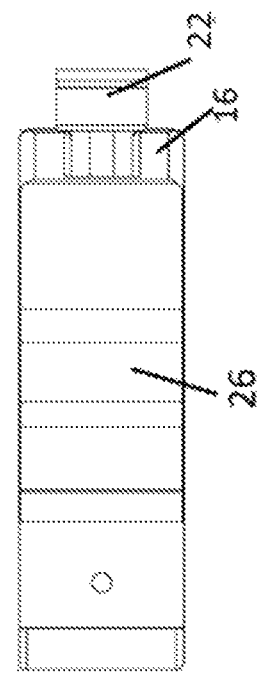
Figure 7C:
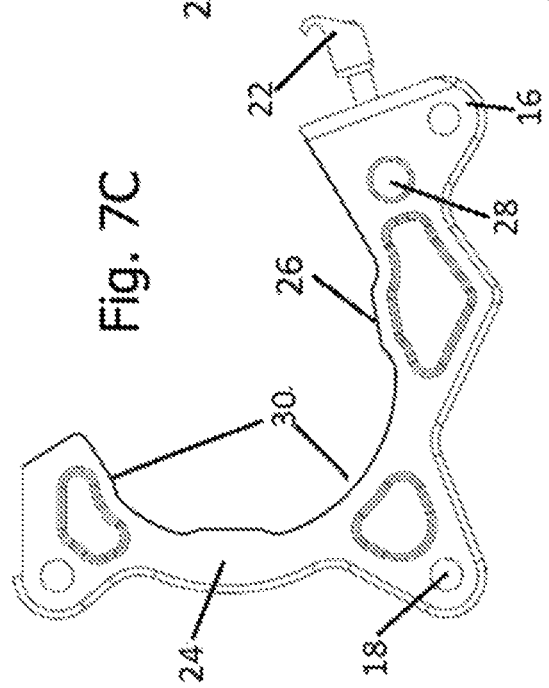
Figure 7A:
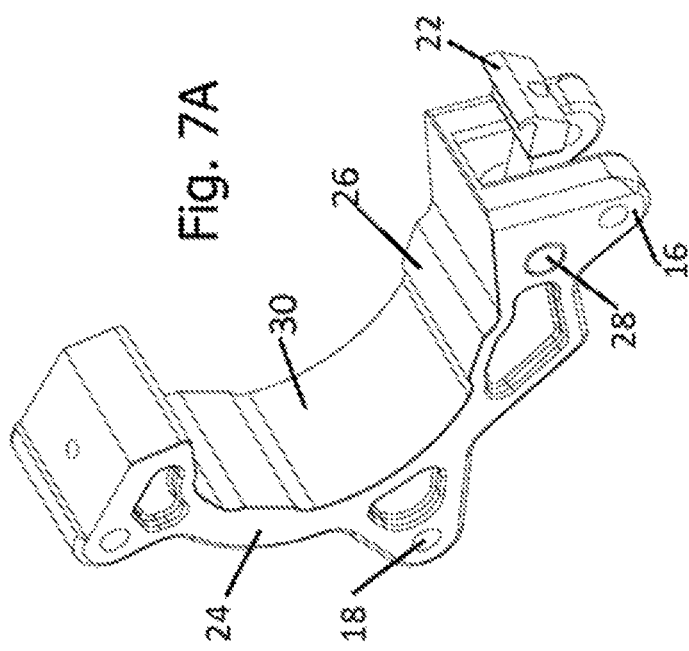

Each stationary clamp assembly extends longer than 50%, but not all the way transversely around the existing elongated rigid member 10 (FIG. 1). The invention is secured by a squeezing/clamping mechanism such as screw tightening 33 (FIGS. 7A-7D and 9), spring steel keeper 34 (FIGS. 6A-6C and 11), or similar under-center latch 32 (FIGS. 3 and 4). Tension grip hook 22 grabs a striation or groove 14 formed as a disruption in the usual smooth, somewhat cylindrical flow of the extruded spar surface.

The groove 14 shown is usually meant for the securing the trampoline 13 (FIG. 11) or other original function of the sailboat such as the mainsail on the mast etc, see FIG. 1. These embodiments are slim enough to share the space with the original intended equipment. All embodiments utilize the unique shape and or a striation of original elongated rigid member of the craft to hold the clamp fast.

There are three basic versions of the embodiments of the accessory clamps each of them utilizing a tightening mechanism that provides a constrictive force by tightening tangentially to the basic curve of the elongated structural member. In general, the clamping system will encompass the elongated structure 50% to 99% circumferentially, depending upon the style. The three embodiments are as follows:
1) an embodiment to include a rigid, non-yielding material that extends at least 50% around the elongated structural member, and less than 80%.
2) an embodiment made of a semi-rigid full-wrap that extends nearly all the way around the elongated structural spar.
3) a hinged embodiment (known as alternate embodiments) that encompasses the elongated spar at least 75% tangentially transversely, but not more than 99%.

Utilizing one, two or more of the clamps, this invention would allow clamping on (beyond the usual seating area of the trampoline) a medium sized dry-box, cooler or battery box that could stow gear as shown in FIG. 1.

This clamp will allow secure affixing without permanent holes and no permanent modifications to the craft at all. The clamp also will allow rapid attachment and detachment of chosen accessory. The clamp utilizes existing striations, and or the variance in the cylindrical nature of the existing elongated rigid members, to ensure no rotational slippage. Compressive forces provided by the embodied invention to more than two points, provide excellent holding power laterally and tangential rotationally in addition.

There are 11 drawings for 4 embodiments including an alternate hinged embodiment.

The components in the drawings follows:

10 Beach catamaran rigid elongated structural member
12 Sailboat traveler track
13 Beach Catamaran trampoline (FIG. 11)
14 Significant striation—groove (FIG. 11)
16 Accessory fastening tabs
18 Accessory fastening holes
19 Structural cross pieces (FIGS. 9, 11)
20 Conforming sheet or sleeve (FIGS. 9, 11)
22 Tension grip hook
23 Gripping hook (FIGS. 4, 5A-5B, 11)
24 Main structural rib (clamp)
26 Main grips (FIGS. 5A-5B, 7A-7D, 8A-8C)
28 Attachment points for tightening mechanism
30 Specific conforming curve (to existing elongated structural member of craft)
32 Hand tighten cam-under (FIGS. 3 and 4)
33 Screw tightening mechanism (requires tools)
34 Hand tighten cam-over (FIGS. 8A-8C, 11)
36 Hinge point of two-piece solid clamp Note: Items 10, 12, 13, and 14 are standard equipment on a typical beach catamaran.

Since most beach catamarans manufactured before 2010 do not have any stowage, the embodied invention has four embodiments that provides connection points for many accessories to alleviate the problem of stowing gear, hanging ladders etcetera. FIG. 1 shows possible uses of these embodiments. Most multi-hull sailboats utilize extruded aluminum 10 (FIGS. 1, 9, 10, 11). All embodiments will allow sailors to attach many items such as:
1) a rack for holding coolers, batteries, or dry-boxes
2) a motor mount, hidden underneath
3) a ladder
4) a seat back
5) a light fixture to the mast for safety
6) any user ideas to make sailing safer, better, or more convenient

Embodiment Number One—Rigid Solid ¾ Clamp (FIGS. 2, 3, 7 and 8)

The body of this clamp is comprised of solid non-yielding material such as aluminum, stainless steel, composite material, or plastic. It will have a basic conforming curve 30 that mimics the circumference of whatever elongated rigid member it is designed to clamp to. It will have at least two main grips 26, to aid in forming/gripping said member. When attached properly to the elongated rigid member, it will encompass at least ⅔ the circumference, but no more than ⅞ the circumference. It is comprised of at least one accessory tab 16, with associated fastening hole 18. It also consists of at least one tightening mechanism attachment point 28. This attachment point will substantially affix a tightening mechanism 33.

Figure 2:
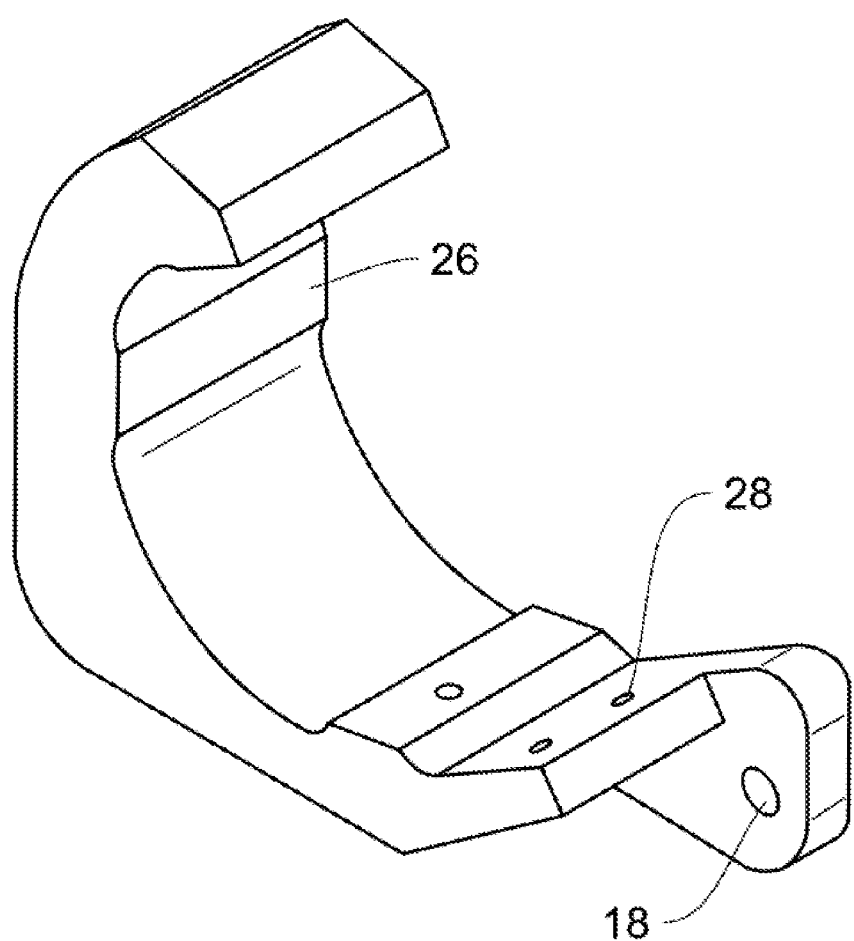
FIG. 2 shows a single connecting point for the clamp.

FIG. 2 shows a simple solid clamp with only one accessory attachment tab 16, the multiple main clamp grips 26, and some basic attachment points for a tightening mechanism 32. This solid structure would be made of any rigid material such as aluminum, stainless steel, or even sturdy plastics.

Figure 9:
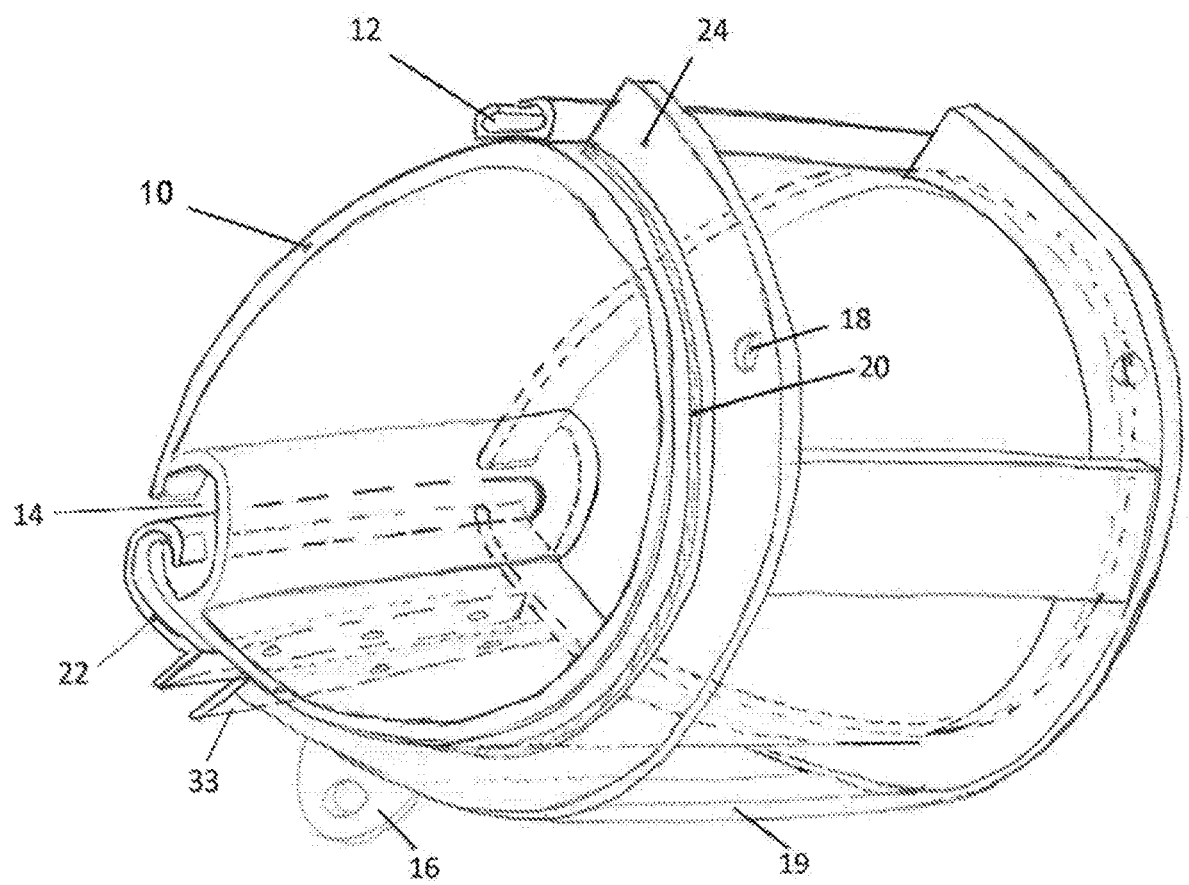
FIG. 9 shows an alternate clamp that is a welded cage style.

FIG. 3 shows a solid material designed to encircle the elongated rigid member 10 (FIGS. 1 and 9), ¾ of the way, allowing room for existing sailboat traveler 12 (FIGS. 1 and 9). FIG. 3 also shows a clamp with two accessory fastening holes 18. This clamp also has a specific conforming curve 30, that spreads the force provided by the hand tightening mechanism 32 (FIGS. 3, 4, 8A-8C, and 11).

FIGS. 7A-7D are blue-water embodiments of the clamp shown in FIGS. 8A-8C. The only difference is in the clamping mechanism 33 (FIGS. 7A-7D, 9 and 10) that is comprised of a threaded shaft that requires tools to tighten or loosen FIGS. 7A and 7B. Further, the tension grip hook 22 is completely made of non-yielding material such as stainless steel or aircraft aluminum. The screw type tightening mechanism is secured with a kingpin attachment point for tightening mechanism 33, composed of sturdy material such as aluminum, stainless steel, brass, or some similar composite material.

Figure 10:
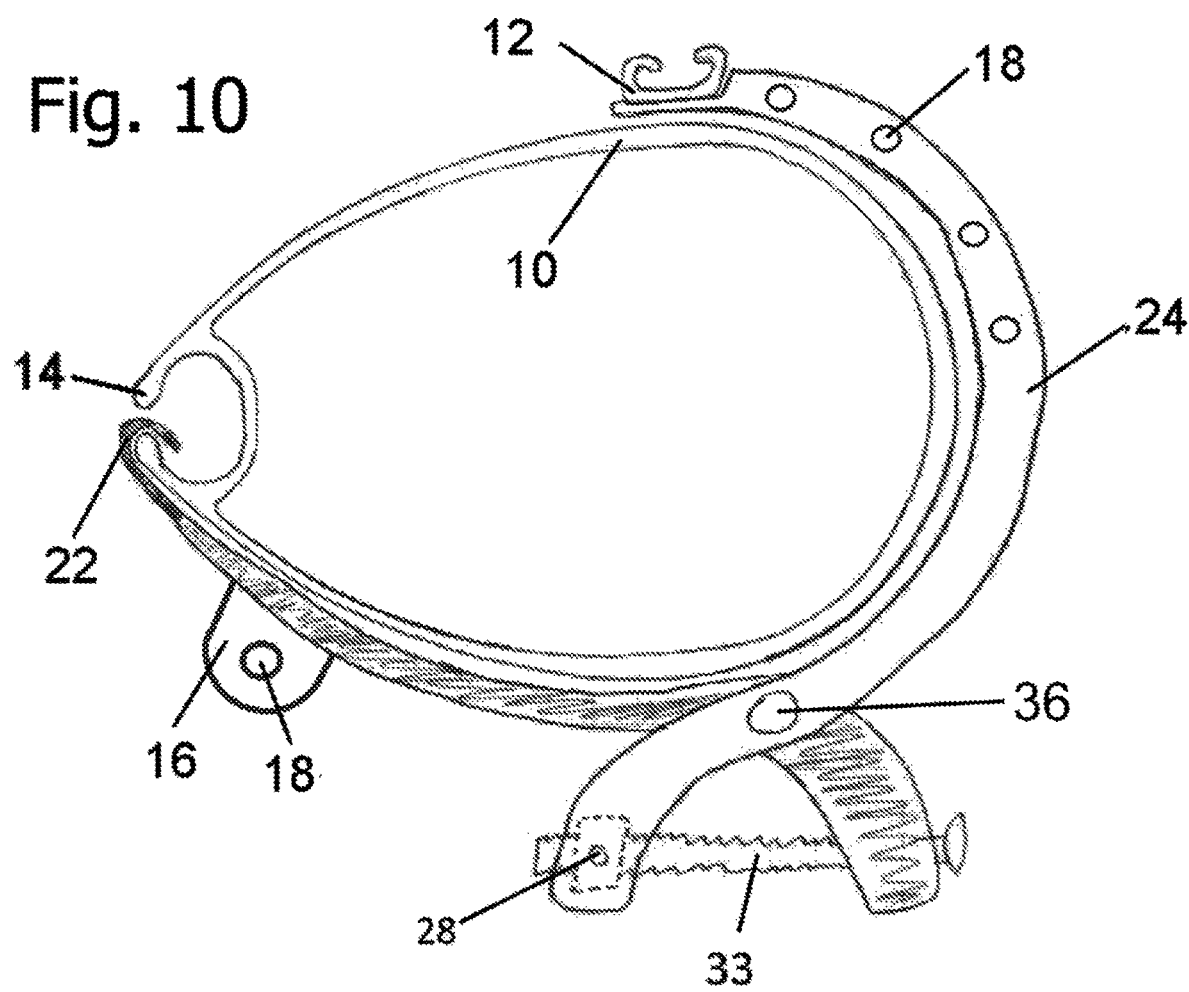
FIG. 10 shows an alternate clamp that is a ¾ wrap scissor style.

FIGS. 8A-8C are like FIGS. 2, 3 and 7A-7D in that they are primarily made of one solid piece of stiff non-yielding material that is at least ¼ inch thick, at least ½ inch wide, and wrap approximately ¾ around the rigid elongated member 10 (FIGS. 1, 9, and 10). These figures show a clamp made primarily of one solid piece but having three or more fastening tabs 16 (FIGS. 4, 5A-5B, 7A-7D, and 9), and multiple main clamp grips 26 (FIGS. 2, 7A-7D, and 8A-8) that are slightly raised from the specific conforming curve 30 (FIGS. 3, 5A-5B, 7A-7D and 8A-8C). FIGS. 8A-8C also shows a single thick main structural rib 24 (FIGS. 2, 3, 7A-7D and 8). FIGS. 8A-8C shows a modified Commercial-Off-The-Shelf (COTS) tightening mechanism 34. Alternately, this tightening mechanism could be a cam-under design (as seen in FIGS. 3 and 4).

Description of First Alternate Embodiment: FIG. 9 was the original embodiment of a beach catamaran solid ¾ clamp. This embodiment is of a welded cage design with at least two structural ribs 24, and at least two structural cross pieces 19. This cage comprised of rigid parts 19 and 24 surrounding and welded to a piece of conforming sheet 20, creates a single solid structure. This embodiment is made of rigid sturdy material like aluminum, steel, stainless or possibly plastic. This figure also shows another version of the screw type tightening mechanism 33 and a much wider tension grip hook 22. The tension grip hook is ideally made of spring steel or semi-flexible stainless steel.

Functional description of embodiment one (hand tightening): This embodiment encircles the elongated rigid sailboat member, typically the trampoline frame as seen in FIG. 1, or possibly the mast, more than ⅔ the circumference of said rigid member. The user would align the conforming curve 30 (FIGS. 8A-8C) to the appropriate curve of the elongated rigid member with the top resting on or near the sailboat traveler track 12 (FIGS. 9 and 10). Once aligned, user would set the tension grip hook 22 at the crevice formed by the trampoline or sail 13 (FIG. 11), and the striation 14 (FIGS. 9 and 10). With a hand tightening mechanism 32, such as the one shown in FIGS. 3, 4 and 8A-8C and the grip hook 22 set in place, the tightening mechanism is actuated to secure the clamp.

Functional description of embodiment one (tool tightening): Embodiment one with a screw type fastener 33 would be similar. Once aligned, user would set the tension grip hook 22 at the crevice formed by the trampoline 13 and the striation 14. While holding in place utilize the appropriate hand tool to tighten the mechanism thus securing the entire clamp with the hook 22 fully seated against the striation.

Once in place the user can utilize common fasteners to attach whatever accessory they wish to the watercraft via the holes 18 in the tabs 16 of the main rib 24. Said accessory hole may be threaded or not, depending on the user's choice.

Embodiment Number Two—Full-Wrap Accessory Clamp

Figure 11:
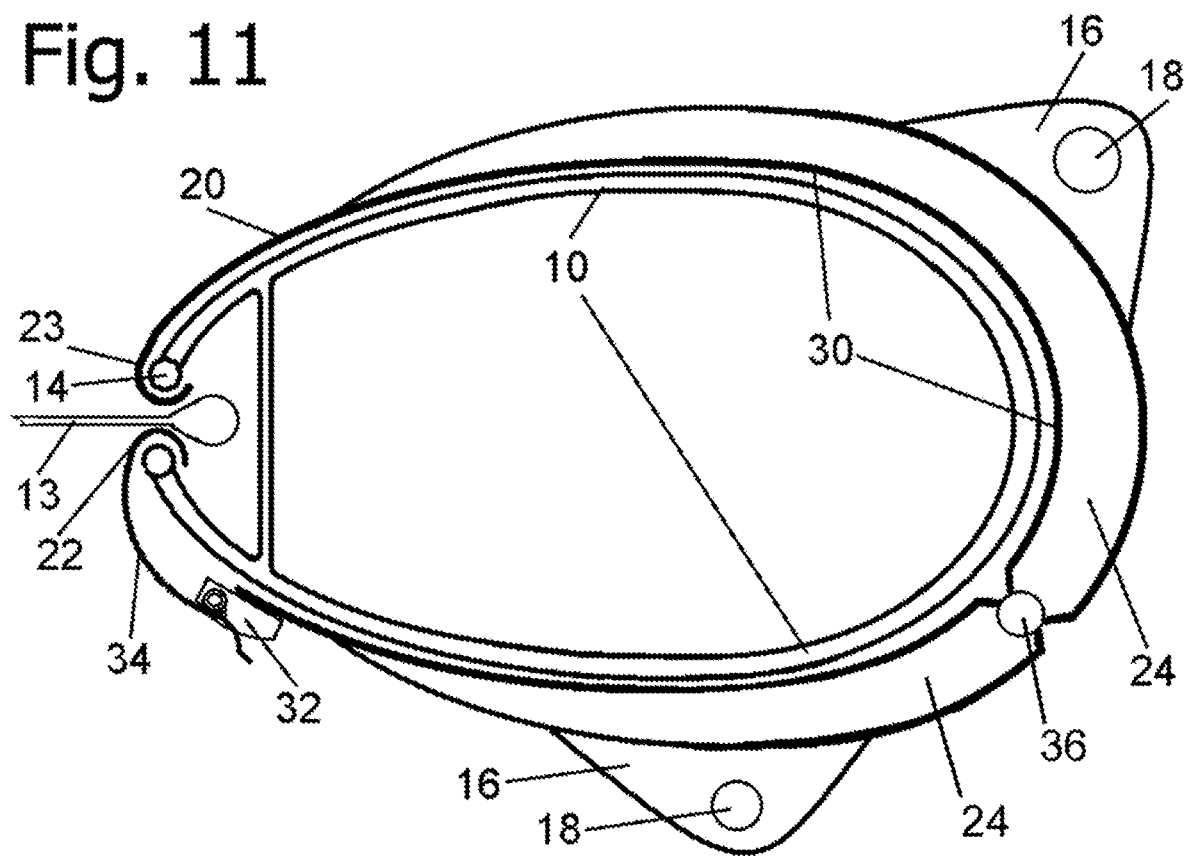
FIG. 11 shows an alternate clamp that is hinged on a cut-away elongated member.

FIG. 4 shows a semi-flexible material 20 (FIGS. 4, 5A-5B, and 6A-6B) that conforms well to the elongated rigid member 10 (FIGS. 1, 9, 10, and 11). This material could be aluminum, or stainless steel; plastic would not be recommended, unless proven to have suitable properties. FIG. 4 also shows narrow accessory fastening tabs 16 (FIGS. 4, 9 and 11). Full-wrap clamps as shown in FIGS. 4, 5A-5B and 6A-6C also need an opposing gripping hook 23. A tightening mechanism 32, 33, or 34 is necessary for the clamps to function. Commercial off the shelf (COTS) mechanisms 32 or 34 are attached as shown in (FIGS. 3, 4 and 11) with common fasteners such as screws, bolts or rivets. Custom tightening mechanisms are shown in FIGS. 5A-5B, 6A-6B, 7A-7D, 9 and 10.

FIGS. 5A-5B and 6A-6B are the ocean/commercial full-wrap embodiment of the accessory clamp. This embodiment is like FIG. 4 although the tabs 16, are now much wider primarily for safety. The lowest tab may be incorporated into an attachment point 28 (FIGS. 5A-5B and 6A-6B) for tightening mechanism 33 that requires hand tools to fully tighten. These connection points can be achieved in ways other than holes and common fasteners; FIGS. 5A-5B shows a wraparound at the fastener a that requires no welding; however, a spot weld would add structural integrity. This embodiment utilizes a full wrap of conforming sheet 20 (FIGS. 5A-5B, 9, and 11) that encompasses over 90% of the circumference of the elongated rigid member 10 (FIGS. 1, 4, 9, and 11).

Also shown are slight alternatives of the tension grip hook 22, typically comprised of specifically bent or forged metal (FIGS. 3, 4, 5A-5B and 6A-6C), bent spring steel (FIGS. 8A-8C, 11), or milled metal as seen in FIG. 7A-7D.

FIGS. 6A-6C is an isometric illustration, showing the fourth embodiment attached to a typical rigid elongated member of a sailboat. This figure is solely to illustrate use of this embodiment.

Functional Description of Embodiment Number Two

The user would position entire clamp with the main curve 30 aligned with the surface of the elongated rigid member but tipped up 30 degrees, force by hand the opposing gripping hook(s) 23 between the upper striation 14 and the trampoline 13. Once hook is sufficiently inserted, hold in place with one hand and bend remaining conforming sheet 20 around elongated rigid member with the other hand. Insert the grip hook 22 between the trampoline and lower striation Secure the fastener 32 or 33 by hand or with simple hand tools as required, until entire clamp is secure. Attach accessories as the user sees fit utilizing tabs 16 and mounting holes 18.

Description of embodiment Number Three (Hinged Accessory Clamp): FIG. 10 is an alternate embodiment of the ¾ beach catamaran accessory clamp. This clamp utilizes the screw type tightening mechanism 33. A main difference with this embodiment is that the tightening mechanism utilizes a hinge that acts like a scissor effect to grip the rigid elongated extrusion. The entire structure would need to be made of a strong material such as aluminum or stainless steel.

FIG. 11 is an alternate of the full wrap beach catamaran clamp. This clamp is comprised of two main structural ribs 24, that are fastened together with a pivot or hinge mechanism 36 (FIGS. 10 and 11). These two ribs are surrounding and fastened to a sheet of conforming material 20. This embodiment also utilizes the cam over tightening mechanism 34 with a spring steel keeper. Possibly one could use a screw type tightening mechanism 33, not shown here. This embodiment also could be designed as a cage style as shown in FIG. 9, that would utilize at least four ribs 24, possibly two on the upper section and two on the lower with multiple structural cross pieces 19.

Operation of Embodiment Number Three

¾ clamp FIG. 10—The user would align the conforming curve 30 (FIG. 7A-7D) to the appropriate curve of the elongated rigid member. Once aligned, user would set the tension grip hook 22 at the crevice formed by the trampoline 13 and the striation 14. While holding in place utilize the appropriate hand tool to tighten the mechanism thus securing the entire clamp with the hook 22 fully seated against the striation.

Full-wrap hinged clamp (FIG. 11): The user would position entire clamp with the main curve 30 aligned with the surface of the elongated rigid member but tipped up 30 degrees, force by hand the opposing gripping hook(s) 23 between the upper striation 14 and the trampoline 13. Once hook is sufficiently inserted, hold in place with one hand and utilizing hinge 36 swing remaining conforming sheet 20 rib 24 combination around elongated rigid member with the other hand. Insert the grip hook 22 between the trampoline and lower striation. Secure the fastener 32 or 33 until entire clamp is secure.

Once the clamp is in place, the user can utilize common fasteners to attach whatever accessory they wish to the watercraft via the hole 18 in the tab 16 of the main rib 24. The accessory hole may be threaded or not, depending on the user's choice.

An alternate to a rigid or semi-rigid style of clamp as shown in the figures would be a more flexible arrangement, which utilizes both sides of the longitudinal groove (FIGS. 4, 5A-5B, 6A-6B, and 11) to provide a tight clamp/clasp on the spar. With sufficient tension and a wide enough band of material, the tabs 16 would be sufficient to hold accessories mentioned in this document. For lightest loads the strap may possibly be constructed of woven fabric such as nylon or other durable material. For heavier loads such as batteries or coolers, more than one clamp of steel or other metal would be necessary to ensure structural connection of accessories to the craft. Further, multiple clamps would ensure the spread of the load on the original equipment as to not damage said equipment.

The purpose of this invention is to allow someone, a user, to attach various accessories to the solid structure of the multi-hull sailboat without piercing/drilling holes into the craft, at locations not traditionally easy to attach to. Further, it allows for quick attachment and detachment of said accessory to multiple types of multi-hull sailboats. One purpose for quick attachment or detachment would be to prepare to race in a formal race where extra equipment may not be necessary or allowed. Some examples of accessories are:

An Umbrella or Bimini for shade
A dry-box for stowing gear
A cooler for holding beverages or food items
Attaching an anchor or docking lines
Attaching a chair or just chair back mechanism
A ladder mechanism to allow swimmers to get back on board
Attaching a tow rope or dock line to pull floatation devices (aft), or to be towed (forward)
Attaching a small motor for propulsion
Attaching a battery box for a small electric motor, or other electrical accessories
Attaching a through water electrical generator
Attaching a small wind mill electric generator
Attaching removable electric voltaic solar panels
Utilizing at least two to attach a hammock or other sleeping arrangement
Attaching a light to the mast (similar extruded aluminum)
Attaching a temporary anti-turtle float at the top of the mast
Attaching a mast lift assist system The clamp is utilized by affixing one's choice of clamp, one can simply utilize the attachment points 16 by using bolt, pins clevis, d-rings etc to attach virtually any accessory of one's choosing. In the case of the aft cross-member 10 (FIG. 1), where the main traveler channel 12 is in the way, the ¾ clamp would be utilized Anywhere else that original equipment is not in the way one could choose a full wrap-around or any the suitable alternate clamps.

To detach the ¾ clamp (embodiment #1), loosen tightening mechanism, gently tap hook 22 out of void created by striations 14. Once the hook is free, pull the clamp assembly off in the opposite direction of striations 14. Be sure to reconnect hook 22 with screw and clamp while removed, so that the hook 22 doesn't get misplaced. Alternatively, release cam-over latch 32, swing the lower section of clamp down and away from spar 10.

To remove the full-wrap style clamp (FIGS. 4, 5, 6A-6B and 11), release the tightening mechanism 33, then tilt entire clamp upward approximately 20 degrees from spar and shove forward (toward trampoline or sail) until upper hook 23 disengages from attachment point 14 of structural spar.

Alternate Ways to Achieve a Similar Result
1) In FIG. 1 the ¾ sleeve 20 could extend under mainsheet travel groove 12 if rivets were removed, holes drilled into sleeve, and rivets replaced into original holes of spar. This would provide an even more secure mount without drilling any new holes into existing craft. However, this would not be and easy-on easy off scenario.
2) Thin metal or other material could be slipped under mainsheet travel groove 12 and fastened through trampoline grommets to same thin metal wrapped all the way around existing spar and securing on the bottom side of trampoline grommets.
3) The clamp could be made without sleeve 20 (FIG. 9), with thicker ribs 24, and enough cross-members 19 to provide sufficient stiffness.
4) Clamp material could be of any substance with enough strength to resist bending or cracking.
5) A hand assisted latching device 32 (as seen in FIG. 11) could be modified to be part of the ribs 24 of FIG. 9.
6) A hand assisted latching device 32 could be any type of hand tightening device such as under center latch shown in FIGS. 3 and 4 or over center device as shown in FIGS. 8A-8C and 11.
7) The clamp could achieve squeezing feature by a scissor effect as shown in FIG. 10.
8) The entire clamp device could be replaced by strong flexible strapping with similar hooks as 22 that took advantage of the striation, lip or groove 14 in the smooth oblong surface of the structural spar components 10 in FIG. 1.
9) When the shape of the spar does not lend to a ¾ solid clamp, a full wrap clamp based on the design of FIGS. 4, 5A-5B, and 6 may be used on the extreme ends of the spar as to only cause a loss of a few inches it utilization of the main-sail traveler 12.

The invention claimed is:

1. A clamping system for attaching accessories to an elongated structural member of a watercraft, comprising;
   a C-shaped element including an inner surface, an outer surface, two distal ends, and a circumferential length between the two distal ends, the C-shaped element being capable of conforming and extending partially but not completely around an elongated structural member of a watercraft and engaging a ridge or striation of the elongated structural member;
   at least one grasping hook positioned on at least one of the two distal ends of the C-shaped element and engaging said ridge or striation of said elongated structural member;
   at least one accessory fastening tab positioned on said outer surface of the C-shaped element, said accessory tab having at least one hole for attaching an accessory thereto; and
   a tightening means positioned proximal to the other one of the two distal ends and on said outer surface of the C-shaped element and configured to tighten the C-shaped element around and in clamping engagement with said elongated structural member.

2. The clamping system according to claim 1, wherein a second grasping hook is disposed at the other of the distal ends of the conforming element and configured to engage said elongated structural member.

3. The clamping system according to claim 1, wherein additional accessory attachment tabs are disposed on said outer surface.

4. The clamping system according to claim 1, wherein at least one structural rib is disposed on the outer surface of said conforming element and said rib extends circumferentially around said conforming element.

5. The clamping system according to claim 4, wherein at least one additional structural rib is disposed on the outer surface of said conforming element and said additional structural rib extends circumferentially around said conforming element.

6. The clamping system according to claim 1, wherein at least one grip structure is disposed on the inner surface of the conforming element and configured to engage said elongated structural member.

* * * * *